US012698995B2

(12) United States Patent　　(10) Patent No.:　US 12,698,995 B2

Guwang et al.　　(45) Date of Patent:　Aug. 4, 2026

(54) METHOD FOR MEASURING THE FLOW RATE OF A FLUID IN A PIPE

(71) Applicant: INTEGRA METERING AG, Therwil (CH)

(72) Inventors: Marcel Guwang, Lacroix-Falgarde (FR); Maxime Morin, Pechbusque (FR); Alain Ramond, Toulouse (FR)

(73) Assignee: SONTEX AG, Sonceboz-Sombeval (CH)

( * ) Notice:　Subject to any disclaimer, the term of this patent is extended or adjusted under 35 U.S.C. 154(b) by 13 days.

(21) Appl. No.: 18/027,627

(22) PCT Filed: Sep. 21, 2021

(86) PCT No.: PCT/FR2021/051617

§ 371 (c)(1),
(2) Date: Mar. 22, 2023

(87) PCT Pub. No.: WO2022/064132

PCT Pub. Date: Mar. 31, 2022

(65) Prior Publication Data

US 2023/0375387 A1　　Nov. 23, 2023

(30) Foreign Application Priority Data

Sep. 22, 2020　(FR) ...................................... 2009589

(51) Int. Cl.
　G01F 1/667　　　(2022.01)
　G01F 1/66　　　(2022.01)
(52) U.S. Cl.
　CPC .............. G01F 1/668 (2013.01); G01F 1/662 (2013.01)

(58) Field of Classification Search
　CPC ............. G01F 1/66; G01F 1/662; G01F 1/668
　See application file for complete search history.

(56) References Cited

U.S. PATENT DOCUMENTS

2008/0250870 A1* 10/2008 Rhodes .................... G01F 1/66
　　　　　　　　　　　　　　　　73/861.27
2008/0289434 A1　11/2008 Takemura et al.
　　　　　　　　　(Continued)

FOREIGN PATENT DOCUMENTS

EP　　　1913342　　　4/2008
EP　　　3611480　　　2/2020

OTHER PUBLICATIONS

International Search Report dated Jan. 4, 2022.

*Primary Examiner* — Kristina M Deherrera
*Assistant Examiner* — Jean F Morello
(74) *Attorney, Agent, or Firm* — IPSILON USA, LLP

(57)　　　　ABSTRACT

The invention relates to a flow measurement method comprising a generation of successive cycles, each cycle comprising: —a step (35) in which an ultrasonic wave is emitted by a first ultrasonic transducer; —a step (36) in which said ultrasonic wave is received by a second ultrasonic transducer; and —a step (37) in which a propagation time of said ultrasonic wave from the first ultrasonic transducer to the second ultrasonic transducer is measured, the method being characterised in that a given cycle is separated from the preceding cycle by an intercycle duration, and in that a flow rate of the fluid is calculated from a difference between the propagation time of the given cycle and an average of the propagation time measured for the preceding cycle and that measured for the cycle following said given cycle.

10 Claims, 3 Drawing Sheets

(56) References Cited

U.S. PATENT DOCUMENTS

| | | | |
|---|---|---|---|
| 2013/0167656 A1* | 7/2013 | Takemura | G01F 1/667 |
| | | | 73/861.28 |
| 2018/0245960 A1* | 8/2018 | Kishiro | G01F 1/668 |
| 2019/0219429 A1 | 7/2019 | Nielsen et al. | |
| 2021/0072058 A1* | 3/2021 | Dixon | G01F 1/66 |
| 2022/0057243 A1* | 2/2022 | Ishida | G01N 11/04 |

* cited by examiner

1

METHOD FOR MEASURING THE FLOW RATE OF A FLUID IN A PIPE

RELATED APPLICATION

This application is a National Phase of PCT/FR2021/051617 filed on Sep. 21, 2021, which claims the benefit of priority from French Patent Application No. 20 09589, filed on Sep. 22, 2020, the entirety of which are incorporated by reference.

TECHNICAL FIELD

The invention relates to a method for measuring the flow rate of a fluid in a pipe. The invention also relates to a flowmeter adapted to implement such a flow rate measurement method.

PRIOR ART

A method for measuring a flow rate of fluid flowing in the pipe between two ultrasound transducers is already known, notably from US 2011/0246098. The measurement method comprises two successive cycles for measuring a time for an ultrasound wave to be propagated between the two transducers. In particular, each cycle comprises:

a step of a first ultrasound transducer transmitting an ultrasound wave;

a step of a second ultrasound transducer receiving said ultrasound wave, the first transducer and the second transducer being arranged opposite one another in a diagonal direction with respect to a longitudinal axis of the pipe; and a step of measuring a time for said ultrasound wave to be propagated from the first ultrasound transducer to the second ultrasound transducer, the first ultrasound transducer for a given cycle corresponding to the second ultrasound transducer for a cycle directly succeeding said given cycle and the second ultrasound transducer for a given cycle corresponding to the first ultrasound transducer for the cycle directly succeeding said given cycle.

Thus, the ultrasound transducer operating as a transmitter during a given cycle operates as a receiver during the cycle which follows this given cycle. Likewise, the ultrasound transducer operating as a receiver during a given cycle operates as a transmitter during the cycle which follows this given cycle.

In particular, the transmission step of the second cycle carried out succeeds the reception step of the first cycle after an intercycle duration of a few milliseconds (4 ms), the time over which the ultrasound fades away.

This method further comprises a step of computing a fluid flow rate, in which the fluid flow rate is computed on the basis of a difference between the propagation time measured during the first measurement cycle carried out and the propagation time measured during the second measurement cycle.

The fact of computing the fluid flow rate on the basis of a difference between two propagation times makes it possible to obtain more reliable results than if the fluid flow rate was computed on the basis of a single propagation time.

Specifically, computing the fluid flow rate on the basis of a difference between two propagation times makes it possible to reduce the influence of the environment on the measurements of the propagation times.

This method may be repeated so as to measure several flow rates at different instants.

The inventors have observed that the precision of the flow rates computed according to such a flow rate measurement method is not always regular. Thus, the flow rates computed by such a flow rate measurement method therefore prove to be relatively unreliable.

Methods for measuring a flow rate of fluid flowing in a pipe between two transducers are also known which use a method for measuring time of flight via phase equalization. This measurement method is also known under the name "phase shift". The documents EP 1 913 342 and EP 3 355 035 describe such methods for measuring the propagation time of an ultrasound wave stream via phase equalization. More specifically, this method consists in transmitting, by means of a transmitting first transducer, an ultrasound wave stream in the direction of a second transducer operating as a receiver. The propagation time of the wave stream is then determined by the phase difference measured between the transmitted wave stream and the received wave stream. This measurement method involves the speed of the stream of fluid which flows in the pipe being computed in the frequency domain.

The precision of this measurement method decreases beyond a certain distance between the transmitting transducer and the receiving transducer. In addition, this method requires a large number of electrical pulses to be used, which involves a prolonged activation time of the electronics and therefore significant energy consumption.

The invention aims to mitigate these drawbacks.

OBJECTS AND SUMMARY DISCLOSURE OF THE INVENTION

The invention therefore aims to propose a method for measuring the flow rate of a fluid which makes it possible to determine reliable and precise flow rates.

The invention also aims to propose such a flow rate measurement method which is simple, quick and cheap in terms of energy.

The invention also aims to propose a flowmeter adapted to implement such a flow rate measurement method.

The invention relates to a method for measuring the flow rate of a fluid in a pipe using at least two ultrasound transducers, the method comprising generating successive cycles which are controlled by a control unit, each cycle comprising:

a step of a first ultrasound transducer from among said at least two ultrasound transducers transmitting an ultrasound wave;

a step of a second ultrasound transducer from among said at least two ultrasound transducers receiving said ultrasound wave; and a step of measuring a time for said ultrasound wave to be propagated from the first ultrasound transducer to the second ultrasound transducer, the first ultrasound transducer for a given cycle corresponding to the second ultrasound transducer for a cycle directly succeeding said given cycle and the second ultrasound transducer for a given cycle corresponding to the first ultrasound transducer for the cycle directly succeeding said given cycle, the method being characterized in that a given cycle is separated from a cycle directly preceding said given cycle by a duration, referred to as the intercycle duration, which is greater than or equal to 15 ms, and in that it comprises at least one fluid flow rate computation step in which a flow rate of the fluid flowing at the time of a given cycle in the pipe is computed on the basis of a difference between the propagation time measured for said given cycle and an average between the propagation time measured for the preceding cycle and the propagation time measured for the cycle directly succeeding said given cycle.

The expression "the cycle directly succeeding the given cycle" denotes the first cycle which follows the given cycle in the succession of cycles which are carried out in the measurement method. Likewise, the expression "the cycle directly preceding the given cycle" denotes the last cycle which precedes the given cycle in the set of cycles which are carried out in the measurement method.

In particular, the difference found during the flow rate computation step is multiplied by −1 every other cycle in order to keep a result with the same sign.

Said intercycle duration is a few milliseconds, that is to say a duration which is sufficient for the ultrasound waves to fade away. In certain advantageous embodiments according to the invention, said intercycle duration is greater than the time for the ultrasound waves to fade away, notably greater than 15 ms, in particular between 15 ms and 4000 ms (4 seconds), and more particularly between 100 ms and 2000 ms (2 seconds) and for example between 200 ms and 800 ms.

Preferably, the fluid flow rate is determined on the basis of a predetermined table in which propagation time difference results are associated with flow rates. The table may also take the temperature of the fluid into account.

In certain advantageous embodiments according to the invention, the measurement method comprises a step of at least partially putting the control unit on standby between each cycle.

In some embodiments of the invention, when the control unit is activated to carry out a flow rate measurement step, the method comprises a stabilization period of the control unit, each cycle being carried out during said stabilization period of the control unit. In order to compensate for the instability of the electronics, notably of the transducers and of the control unit, the step of transmitting the ultrasound wave of each cycle is performed at the same moment of the stabilization period, this making it possible, for several successive cycles, to transmit the ultrasound wave in the same state of instability. Repeating the steps of each cycle according to a defined chronology makes it possible to compensate for the errors which may result from the stabilization period of the control unit. In addition, this makes it possible to reduce the activation time of the control unit and therefore to reduce the energy consumption.

In some embodiments of the invention, the ultrasound wave is generated by a first transducer operating as a transmitter on the basis of a square electrical pulse. Unlike the phase equalization measurement method, transmitting a single electrical pulse in order to generate an ultrasound wave makes it possible to improve the precision of the measurement by providing an ultrasound wave the signal of which is short. For example, the signal may have a duration of half a wavelength. The activation time of the electronics of the flowmeter and the electrical energy consumption are thus reduced.

In some embodiments of the invention, the transmission step is performed in a time interval which is less than 1 μs. The constancy of the duration of the time interval in which the ultrasound wave is transmitted contributes to compensating for the errors which may result from the stabilization period.

In some embodiments of the invention, the control unit comprises two clocks, a first clock being used to count most of the propagation time, while a second clock is used to obtain a precise measurement of the propagation time, the second clock being triggered as close as possible to the moment at which the ultrasound wave is received by the second transducer operating as a receiver. In particular, the first clock starts each cycle after the intercycle duration.

The invention also extends to a flowmeter adapted to implement a method according to the invention.

In particular, the invention therefore also extends to a flowmeter comprising:
  at least two ultrasound transducers which are adapted to be joined to a pipe,
  a control unit programmed to control generation of successive cycles, each comprising:
    a step of a first ultrasound transducer from among said at least two ultrasound transducers transmitting an ultrasound wave;
    a step of a second transducer from among said at least two ultrasound transducers receiving the transmitted ultrasound wave; and
    a step of measuring a time for said ultrasound wave to be propagated from the first ultrasound transducer to the second ultrasound transducer,
the first ultrasound transducer for a given cycle corresponding to the second ultrasound transducer for a cycle directly succeeding said given cycle and the second ultrasound transducer for a given cycle corresponding to the first ultrasound transducer for the cycle directly succeeding said given cycle,
characterized in that a given cycle is separated from a cycle directly preceding said given cycle by a duration, referred to as the intercycle duration, which is greater than or equal to 15 ms, and in that the control unit is programmed to carry out at least one fluid flow rate computation step in which a flow rate of fluid flowing at the time of a given cycle in the pipe is computed on the basis of a difference between the propagation time measured for said given cycle and an average between the propagation time measured for the preceding cycle and the propagation time measured for the cycle directly succeeding said given cycle.

For example, the first transducer and the second transducer are adapted to be mounted on a pipe so as to be arranged opposite one another in a diagonal direction with respect to a longitudinal axis of the pipe. Nevertheless, nothing prevents a flowmeter comprising two transducers which are adapted to be arranged inside the pipe opposite one another on the longitudinal axis of the pipe from being provided. Moreover, it is also possible to provide a flowmeter comprising a single ultrasound transducer and an ultrasound wave reflector which is arranged inside the pipe. This single ultrasound transducer is then placed facing the reflector so that this transducer may transmit then receive ultrasound waves by reflecting them on the reflector. In this case, the first transducer and the second transducer are the same.

In certain advantageous embodiments according to the invention, the flowmeter comprises said pipe on which the two ultrasound transducers are mounted, this pipe having two longitudinal ends comprising a connecting member.

The invention also relates to a flow rate measurement method and a flowmeter characterized, in combination or otherwise, by all or some of the features mentioned above or below. Whatever formal presentation is given of them, unless explicitly stated otherwise, the various features mentioned above or below should not be considered to be intimately or inextricably linked to one another, it being possible for the invention to relate to only one of these structural or functional features, or only some of these structural or functional features, or only a part of one of these structural or functional features, or indeed any grouping, combination or juxtaposition of all or some of these structural or functional features.

DESCRIPTION OF THE DRAWINGS

Other aims, features and advantages of the invention will become apparent on reading the following non-limiting description of some of its possible embodiments, which refers to the appended figures, in which.

DESCRIPTION OF THE EMBODIMENTS

Figure 1:
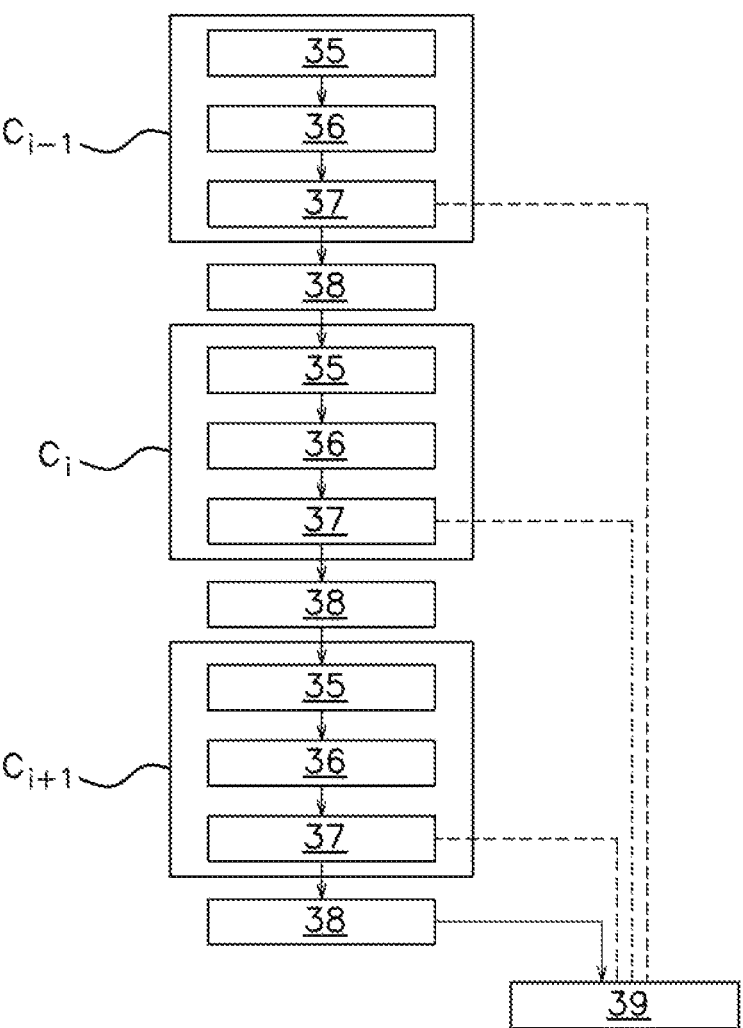
FIG. 1 is a flow chart showing six successive cycles of a flow rate measurement method according to the invention.

A method 28 for measuring the flow rate of a fluid flowing in a pipe according to one embodiment of the invention is shown in FIG. 1. This flow rate measurement method 28 may be implemented by any type of ultrasound flowmeter operating on the basis of measurements of differences in the propagation times of the ultrasound waves by at least one ultrasound transducer.

Figure 2:
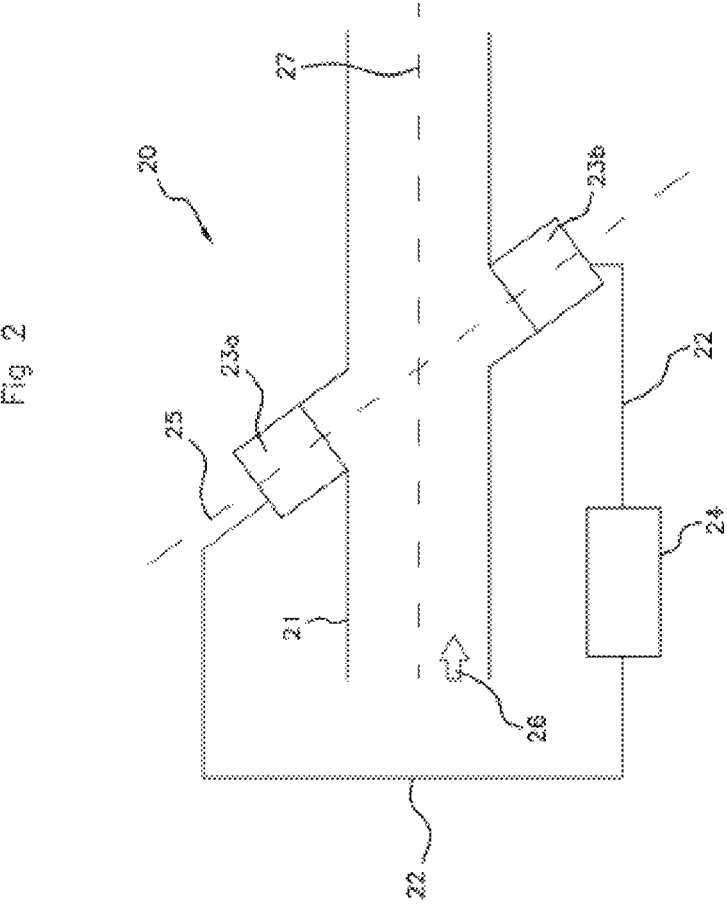
FIG. 2 is an overview diagram of a longitudinal cross section of a flowmeter according to one embodiment of the invention, FIG. 3 comprises time diagrams showing six successive cycles of a flow rate measurement method according to the invention.

By way of example, the flowmeter 20 shown in FIG. 2 is adapted to implement the measurement method 28. This flowmeter 20 comprises two ultrasound transducers 23a, 23b which are mounted on a pipe 21 extending longitudinally along and about a theoretical longitudinal axis 27. The pipe 21 comprises a wall delimiting a passage in which a fluid 26 may flow. The transducers 23a, 23b are mounted on the wall of the pipe 21 and arranged opposite one another in a diagonal direction 25 with respect to the longitudinal axis 27 of the pipe 21. Each transducer 23a, 23b is adapted to transmit ultrasound waves and to receive ultrasound waves. Thus, each transducer 23a, 23b may operate as a transmitting transducer so as to be able to transmit ultrasound waves or indeed as a receiving transducer so as to be able to receive ultrasound waves. In particular, when a transducer 23a, 23b operates as a transmitting transducer, this transducer 23a, 23b is adapted to convert an electrical signal into an ultrasound wave. Moreover, when a transducer 23a, 23b operates as a receiving transducer, this transducer 23a, 23b is adapted to convert an ultrasound wave into an electrical signal.

The transducers 23a, 23b are arranged so that an ultrasound wave transmitted by one of these two transducers may be propagated through the pipe 21 in said diagonal direction 25 in order to be received directly by the other transducer without intermediate reflection of the ultrasound wave on a wall of the pipe.

As a variant, nothing prevents, for example, a flowmeter comprising two transducers which are arranged inside the pipe opposite one another on the longitudinal axis of the pipe from being provided. Moreover, it is also possible to provide a flowmeter comprising a single ultrasound transducer and an ultrasound wave reflector which are arranged inside the pipe. This single ultrasound transducer is then placed facing the reflector so that this transducer may transmit ultrasound waves then receive them by reflecting them on the reflector. This transducer then operates first of all as a transmitter then as a receiver. The flowmeter 20 also comprises a control unit 24 connected to the transducers 23a, 23b by electrically conductive connections 22. The control unit comprises at least one integrated circuit, notably chosen from among a microcontroller, a microprocessor, an application-specific integrated circuit (ASIC) and a programmable logic circuit. The control unit also comprises a memory. Preferably, the control unit also comprises a pulse generator, a signal amplifier, a zero-crossing detector, a time capture, a sequencing state machine and a computing processor. In particular, the control unit 24 comprises at least one real-time clock. Preferably, the control unit 24 comprises two clocks. A first clock is used to count most of the propagation time. This clock operates at a frequency which is greater than 10 MHz, for example in the order of 16 MHz. A second clock is used to obtain a precise measurement of the propagation time. This second clock is triggered as close as possible to the moment at which the ultrasound wave is received by the transducer operating as a receiver. This second clock operates at a frequency which is greater than that of the first clock, notably at a frequency which is greater than 1 GHz, for example in the order of 26 GHz.

This control unit 24 is adapted to control each transducer 23a, 23b so as to make them operate as a transmitting transducer or as a receiving transducer. In particular, when one of the two transducers 23a, 23b is controlled so as to operate as a transmitting transducer, the other transducer 23a, 23b is controlled so as to operate as a receiving transducer.

More particularly, the control unit 24 is adapted to supply the transducer 23a, 23b controlled as a transmitting transducer with an electrical signal, referred to as the control signal, via the electrically conductive connection 22 connecting the control unit 24 to this transducer 23a, 23b. This transducer 23a, 23b operating as a transmitting transducer is thus adapted to convert this control signal into an ultrasound wave which is then propagated through the pipe 21 to the other transducer operating as a receiving transducer.

Moreover, the control unit 24 is adapted to acquire an electrical signal, referred to as the reception signal, generated by the transducer 23a, 23b controlled so as to operate as a receiving transducer, this reception signal being generated on the basis of an ultrasound wave received by this transducer operating as a receiving transducer and transmitted to the control unit 24 via the electrically conductive connection 22 connecting the control unit 24 to this transducer operating as a receiving transducer.

Furthermore, the control unit is adapted to measure a time Tprop for an ultrasound wave to be propagated in the pipe 21 between a transducer 23a, 23b transmitting this ultrasound wave and the other transducer 23a, 23b. For this purpose, the control unit uses its pair of clocks to measure the propagation time on the basis of a control signal transmitted by the processing unit 24 and of a reception signal transmitted by the receiving transducer and acquired by the processing unit 24.

Thus, the control unit 24 is adapted to control generation of successive cycles, as will presently be explained with reference to FIGS. 1 and 3, notably in the non-limiting case of six successive cycles labeled $C_1$ to $C_6$.

Each cycle $C_i$ comprises:

a step 35 of a first transducer chosen from among the transducers 23a, 23b transmitting an ultrasound wave in order to operate as a transmitting transducer, a step 36 of the second transducer, operating as a receiving transducer, receiving this ultrasound wave, and a step 37 of measuring a time Tprop$_i$ for said ultrasound wave to be propagated from the transducer 23a, 23b operating as a transmitting transducer to the transducer 23a, 23b operating as a receiving transducer.

Figure 3:
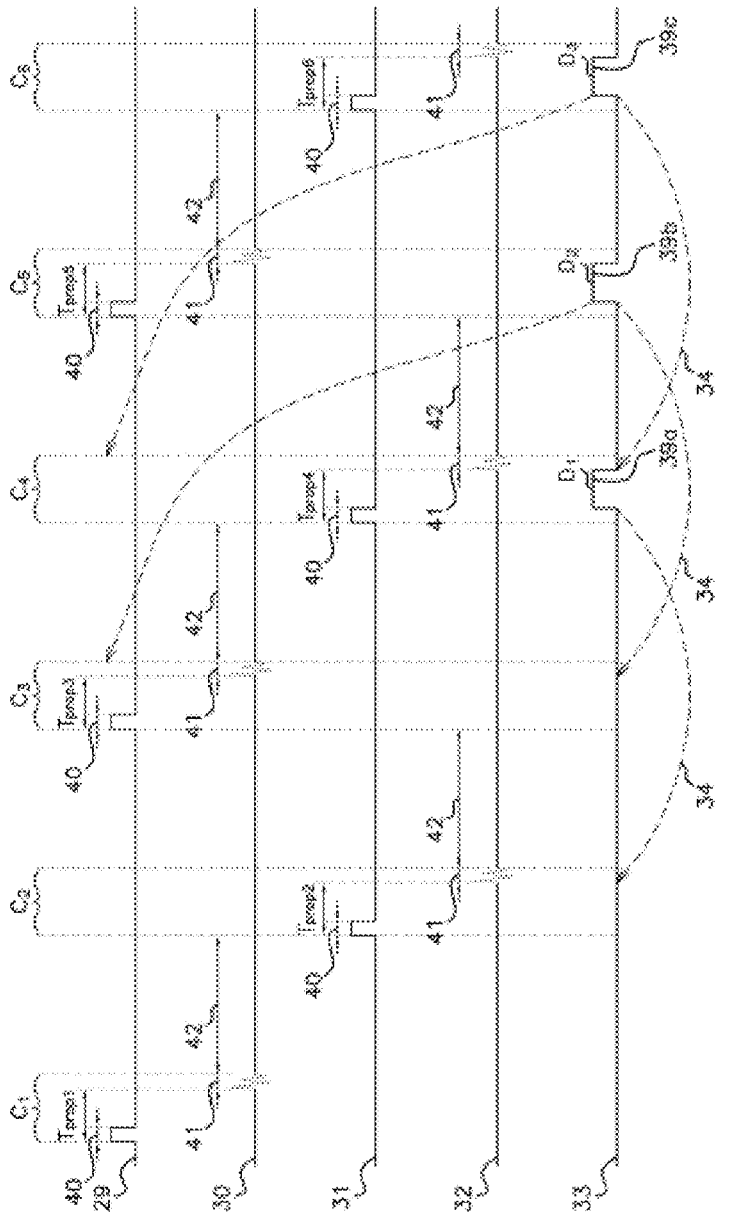

In particular, for each cycle C$_i$, during a transmission step 35, the ultrasound wave is transmitted over a predefined transmission time interval 40 (see FIG. 3). Moreover, for each reception step 36, the ultrasound wave is received over a reception time interval 41 (see FIG. 3).

More particularly, as illustrated in FIG. 3, the ultrasound wave is generated by the transducer operating as a transmitter on the basis of a square electrical pulse, for example of a duration of half a wavelength, or indeed on the basis of a square signal of a greater duration. In particular, the predefined transmission time interval 40 is less than 1 μs, more particularly between 100 ns and 250 ns, for example in the order of 125 ns. Moreover, the predefined reception time interval 41 is less than 40 μs, more particularly between 2 μs and 20 μs, for example in the order of 5 μs.

The measurement method comprises at least three successive cycles. Throughout the text, what is meant by the term "directly", in particular in the expressions "cycle C$_{i+1}$ directly succeeding the given cycle C$_i$" and "cycle C$_{i-1}$ directly preceding the given cycle C$_i$" is that the cycle C$_{i+1}$ directly succeeding the given cycle C$_i$ corresponds to the first cycle carried out after the given cycle C$_i$ and that the cycle C$_i$ directly preceding the given cycle C$_i$ corresponds to the last cycle carried out before the given cycle C$_i$. The given cycle C$_i$ may correspond to any cycle of a measurement method according to the invention.

The transducer 23a, 23b operating as a transmitting transducer and the transducer 23a, 23b operating as a receiving transducer are selected alternately between two successive cycles. Thus, the transducer 23a, 23b operating as a transmitting transducer for a given cycle C$_i$ operates as a receiving transducer for a cycle C$_{i+1}$ directly succeeding the given cycle C$_i$. Moreover, the transducer 23a, 23b operating as a receiving transducer for a given cycle C$_i$ operates as a transmitting transducer for a cycle C$_{i+1}$ directly succeeding the given cycle C$_i$. Thus, for a given cycle C$_i$, the ultrasound wave is transmitted by a first transducer 23a, 23b operating as a transducer transmitting to the second transducer 23a, 23b operating as a receiving transducer. In other words, the ultrasound wave is transmitted in a first propagation direction with respect to the direction in which the fluid 26 flows, for example upstream. For the cycle C$_{i+1}$ directly succeeding the cycle C$_i$, the ultrasound wave is transmitted by the second transducer 23a, 23b operating as a transducer transmitting to the first transducer 23a, 23b operating as a receiving transducer. In other words, the ultrasound wave is transmitted in a second propagation direction which is opposite to the first direction, for example downstream.

The flow rate measurement method 28 makes it possible to measure a flow rate of a fluid 26 flowing in the pipe 21 between the two transducers 23a, 23b at several given instants.

To illustrate the idea, FIG. 3 gives time diagrams corresponding to six successive cycles C$_1$ to C$_6$.

The line 29 is a time diagram showing the transmission steps for which the transducer 23a operates as a transmitting transducer. When a transmission step 35 is in progress, it is shown by a pulse on the line 29.

The line 30 is a time diagram showing the reception steps for which the transducer 23b operates as a receiving transducer. When a reception step 36 is in progress, it is shown by a signal on the line 30.

The line 31 is a time diagram showing the transmission steps for which the transducer 23b operates as a transmitting transducer. When a transmission step 35 is in progress, it is shown by a pulse on the line 31.

The line 32 is a time diagram showing the reception steps for which the transducer 23a operates as a receiving transducer. When a reception step 36 is in progress, it is shown by a signal on the line 32.

The line 33 is a time diagram showing flow rate computation steps, which are described in more detail below. When a flow rate computation step 39 is in progress, it is shown by a pulse on the line 33. The arrows 34 between the computation steps and the cycles indicate which cycle the flow rate of fluid 26 is computed for (this computed flow rate then being representative of the flow rate of fluid 26 flowing in the pipe 21 during the cycle pointed at by the arrow 34).

Furthermore, the transmission step 35 of a given cycle C$_i$ is separated from the reception step 36 of the cycle C$_{i-1}$ directly preceding said given cycle C$_i$ by a duration, referred to as the intercycle duration 42, which is greater than or equal to 15 ms. More particularly, this intercycle duration 42 is between 125 ms and 4 s, for example in the order of 500 ms. This intercycle duration 42 may be fixed or, indeed, variable. In particular, the first clock makes it possible to start each cycle after said intercycle duration 42.

As seen above, each cycle C$_i$ comprises a step 37 of measuring a time Tprop$_i$ for the ultrasound wave transmitted during this cycle C$_i$ to be propagated between the two transducers 23a, 23b. The propagation time of the ultrasound wave is measured using the pair of clocks.

Moreover, the method comprises at least one fluid flow rate computation step 39 in which a flow rate of a fluid flowing at the time of a given cycle in the pipe is computed. Each fluid flow rate computation step 39 may be carried out by the control unit. As a variant, nothing prevents a computing unit which is external to the control unit and makes it possible to carry out the flow rate computation steps from being provided. The flow rate computation steps are preferably carried out at the time of the cycles, as illustrated by the line 33 of FIG. 3. Nevertheless, the flow rate computation steps may also be carried out between the cycles.

For each computation step 39, a flow rate of fluid flowing at the time of a given cycle C$_i$ in the pipe is computed on the basis of the propagation time measured during this given cycle C$_i$, of the propagation time measured during a cycle C$_{i-1}$ directly preceding this given cycle C$_i$, and of the measured propagation time of a cycle C$_{i+1}$ directly succeeding the given cycle C$_i$. In particular, this flow rate is computed on the basis of a difference between:

the propagation time Tprop$_i$ measured during the propagation time measurement step 37 of said given cycle C$_i$ and an average between the propagation time Tprop$_{i-1}$ measured during the propagation time measurement step 37 of a cycle C$_{i-1}$ directly preceding the given cycle C$_i$ and the propagation time Tprop$_{i+1}$ measured during the propagation time measurement step 37 of a cycle C$_{i+1}$ directly succeeding the given cycle C$_i$.

Thus, the flow rate of the fluid in the pipe at the time of a given cycle C$_i$ is computed on the basis of this difference in propagation time according to the following formula [Math. 1]:

$$Tprop_i - \frac{Tprop_{i-1} + Tprop_{i+1}}{2} \qquad \text{[Math. 1]}$$

where:

Tprop$_i$ is the propagation time of the ultrasound wave transmitted during the given cycle C$_i$, this ultrasound wave being transmitted in a first direction with respect to the direction in which the fluid flows in the pipe, Tprop$_{i-1}$ is the propagation time of the ultrasound wave transmitted in a direction which is opposite to said first direction during a cycle C$_{i-1}$ directly preceding said given cycle C$_i$, Tprop$_{i+1}$ is the propagation time of the ultrasound wave transmitted in a direction which is opposite to said first direction during a cycle C$_{i+1}$ directly succeeding said given cycle C$_i$.

For example, the flow rate D$_2$ of the fluid in the pipe at the time of the cycle C$_3$ is computed during the computation step 39 on the basis of this difference in propagation time according to the following formula [Math. 2].

$$Tprop_3 - \frac{Tprop_2 + Tprop_4}{2} \qquad \text{[Math. 2]}$$

More particularly, preferably, the fluid flow rate is determined on the basis of a predetermined table in which propagation time difference results are associated with flow rates. The table may also take the temperature of the fluid into account. In particular, as indicated by the dashed arrows 34 in FIG. 3, the flow rate D$_1$ computed during the computation step 39a corresponds to the flow rate of the fluid in the pipe at the time of the cycle C$_2$, the flow rate D$_2$ computed during the computation step 39b corresponds to the flow rate of the fluid in the pipe at the time of the cycle C$_3$ and the flow rate D$_3$ computed during the computation step 39c corresponds to the flow rate of the fluid in the pipe at the time of the cycle C$_4$.

A flow rate measurement method according to the invention makes it possible to obtain more reliable flow rates than those obtained by known flow rate measurement methods. Specifically, as seen above, the known flow rate measurement methods comprise two successive cycles, each cycle comprising a step of a first transducer transmitting an ultrasound wave, which is similar to the step 35, a step of a second transducer receiving the ultrasound wave, which is similar to the step 36, and a step of measuring the time for the ultrasound wave to be propagated between the two transducers, which is similar to the step 37, and the transmission or reception roles of the first and second transducers being reversed for two successive cycles. Unlike the present invention, the intercycle duration is in the order of 4 ms, and the flow rate is computed on the basis of a difference between the propagation times of the ultrasound waves measured for two successive cycles.

The inventors have remarked that, in these known flow rate measurement methods, the flow rates computed on the basis of the times for the ultrasound waves to be propagated between the transducers are skewed because of an asymmetry in the operating conditions of the flowmeter between two successive cycles. In other words, in the known flow rate measurement methods, the operating conditions of the flowmeter during a first cycle may be different from the operating conditions during a second cycle. For example, the measurement of the propagation time of the ultrasound wave transmitted during the second cycle may be skewed by echoes in the pipe of the ultrasound wave transmitted during the first cycle because of the duration in the order of 4 ms between these two cycles. The computation of the flow rate may also be skewed by a modification of the temperature of the fluid flowing in the pipe or a modification of the temperature of the control unit between two successive cycles.

A flow rate measurement method according to the invention makes it possible to compute the flow rate on the basis of measurements of propagation times of ultrasound waves performed in the same operating conditions of the flowmeter or at least to compensate for an asymmetry in the operating conditions of the flowmeter.

In particular, by inserting an intercycle duration 42 which is greater than or equal to 15 ms between two successive cycles, a flow rate measurement method according to the invention makes it possible to avoid an echo in the pipe of an ultrasound wave transmitted during a given cycle interfering with the measurement of a propagation time of an ultrasound wave transmitted during a subsequent cycle. Specifically, this intercycle duration 42 is large enough for the echoes in the pipe to dissipate.

Moreover, a flow rate measurement method according to the invention makes it possible to compensate for a linear change in the operating conditions of the flowmeter, notably a linear change in the temperature, by virtue of inserting an intercycle duration 42 which is greater than or equal to 15 ms (notably a fixed duration) between two successive cycles and by virtue of the flow rate of the fluid in the pipe at the time of a given cycle C$_i$ being computed on the basis of a difference between the propagation time of the ultrasound wave transmitted during this given cycle C$_i$ and an average of the propagation times of the ultrasound wave transmitted during the cycle C$_{i-1}$ directly preceding said given cycle and of the ultrasound wave transmitted during the cycle C$_{i+1}$ directly succeeding said given cycle. Specifically, the average of the propagation times of the ultrasound wave transmitted during the cycle C$_{i-1}$ and of the ultrasound wave transmitted during the cycle C$_{i+1}$ makes it possible to reduce a linear change in the operating conditions of the flowmeter between said given cycle C$_i$ and the cycle C$_{i+1}$.

Such a flow rate measurement method is simple, quick and cheap to implement but also economical in terms of energy. In particular, the control unit may easily be programmed to implement such a method (the intercycle duration 42 between each cycle preferably being constant, the operating mode of each ultrasound transducer alternating between two cycles, that is to say operation as a transmitting transducer alternating with operation as a receiving transducer).

Thus, the flow rates computed according to a flow rate measurement method according to the invention are more precise and more reliable than those computed according to the known flow rate measurement methods, although in a flow rate measurement method according to the invention the intercycle duration 42 between two successive cycles is long with respect to the one between two cycles of known measurement methods. In particular, it was accepted that, in order to obtain a relatively reliable flow rate on the basis of two propagation times measured during two successive cycles, it was necessary for the second cycle of these two cycles to be carried out immediately after the first cycle, that is to say after a duration in the order of 4 ms. Now, a flow rate measurement method according to the invention demonstrates that a more reliable flow rate than those which may be computed according to known flow rate methods may be obtained by separating each cycle by an intercycle duration 42 which is greater than 15 ms.

Moreover, a flow rate measurement method according to the invention has the advantage of computing a flow rate for each cycle after having carried out three cycles with respect to the known flow rate measurement methods, for which a single fluid flow rate is computed every two cycles. A method according to the invention also makes it possible to obtain reliable flow rate measurements while at the same time distancing the cycles from one another in time, and therefore to reduce the energy consumption.

Furthermore, preferably, a measurement method according to the invention comprises a step 38 of at least partially putting the control unit 24 on standby between each cycle. When the control unit 24 is put on standby, at least some of the electronic components of the control unit 24 are not turned on. In particular, the amplifier and the time counters are not turned on. Preferably, the processor is not turned on when the control unit 24 is on standby either; the whole unit 24 is then on standby. With the control unit 24 being put on standby during the intercycle duration 42, the two ultrasound transducers 23a, 23b are not supplied with electric power. In particular, the first clock makes it possible to activate the control unit so as to carry out each cycle, that is to say that the necessary electronic components of the control unit 24 are turned back on. The computation steps may then be carried out when the control unit 24 is activated during the cycles.

The inventors have remarked that the lack of precision of the flow rates computed according to the known measurement methods may also result from an asymmetry in a state of the electronic components of the flowmeter between two successive cycles. In particular, the known measurement methods may comprise several successive flow rate measurement steps each comprising a first cycle and a second cycle such as those described above. The flow rate measurement steps are generally separated from one another by a duration in the order of 0.5 s. The control unit may be put on standby between the flow rate measurement steps in order to reduce its electrical consumption. Nevertheless, when the control unit is activated to carry out a flow rate measurement step, the first cycle of this flow rate measurement step may be carried out while a stabilization period of the control unit has not ended. During this stabilization period, the operating state of the electronic components of the control unit may change before reaching a desired state (for example charging of the capacitors, heating of the electronics). This transitory stabilization period (or "initialization" period) may thus skew the measurements because the operating state of the electronic components of the control unit may be different between the two cycles of the same flow rate measurement step.

In a flow rate measurement method according to the invention, the fact of putting the control unit on standby between each cycle makes it possible to have the same operating state of the electronic components of the control unit 24 for each cycle. Specifically, each cycle may be carried out during said stabilization period of the control unit. The errors which may result from the stabilization period of the control unit are thus compensated for. Thus, a flow rate measurement method according to the invention makes it possible to improve the precision of the computed flow rates. Moreover, putting the control unit on standby between each cycle makes it possible to reduce the energy consumption of the flowmeter.

The invention may be the subject of numerous variants and applications other than those described above. In particular, it goes without saying that, unless stated otherwise, the various structural and functional features of each of the embodiments described above should not be considered to be combined with and/or intimately and/or inextricably linked to one another but, on the contrary, to be mere juxtapositions. Moreover, the structural and/or functional features of the various embodiments described above may be the subject, as a whole or in part, of any different juxtaposition or any different combination. For example, the pipe 21 may be contained in the flowmeter, this pipe then having connecting members at its longitudinal ends so as to be able to connect the pipe to a pipe network. Moreover, the flowmeter may incorporate more than one pair of ultrasound transducers. A processing unit may then be associated with each pair of transducers. As a variant, a single processing unit may successively control the various pairs of transducers.

The invention claimed is:

1. A method for measuring the flow rate of a fluid in a pipe using at least two ultrasound transducers, the method comprising generating successive cycles which are controlled by a control unit, each cycle comprising:

a step of a first ultrasound transducer from among said at least two ultrasound transducers transmitting an ultrasound wave;

a step of a second ultrasound transducer from among said at least two ultrasound transducers receiving said ultrasound wave; and a step of measuring a time for said ultrasound wave to be propagated from the first ultrasound transducer to the second ultrasound transducer, the first ultrasound transducer for a given cycle corresponding to the second ultrasound transducer for a cycle directly succeeding said given cycle and the second ultrasound transducer for a given cycle corresponding to the first ultrasound transducer for the cycle directly succeeding said given cycle, the method being wherein a given cycle is separated from a cycle directly preceding said given cycle by a duration, referred to as the intercycle duration, which is greater than or equal to 15 ms, and in that it comprises at least one fluid flow rate computation step in which a flow rate of the fluid flowing at the time of a given cycle in the pipe is computed on the basis of a difference between the propagation time measured for said given cycle and an average between the propagation time measured for the preceding cycle and the propagation time measured for the cycle directly succeeding said given cycle.

2. The method as claimed in claim 1, wherein said intercycle duration is between 15 ms and 4000 ms.

3. The method as claimed in claim 1, wherein said method comprises a step of at least partially putting the control unit on standby between each cycle.

4. The method as claimed in claim 3, wherein when the control unit is activated to carry out a flow rate measurement step, the method comprises a stabilization period of the control unit, each cycle being carried out during said stabilization period of the control unit.

5. The method as claimed in claim 1, wherein the ultrasound wave is generated by a first transducer operating as a transmitter on the basis of a square electrical pulse.

6. The method as claimed in claim 1, wherein the transmission step is performed in a time interval which is less than 1 μs.

7. The method as claimed in claim 1, wherein the control unit comprises two clocks, a first clock being used to count most of the propagation time, while a second clock is used to obtain a precise measurement of the propagation time, the second clock being triggered as close as possible to the moment at which the ultrasound wave is received by the second transducer operating as a receiver.

8. The method as claimed in claim 7, wherein the first clock starts each cycle after the intercycle duration.

9. A flowmeter comprising:

at least two ultrasound transducers which are adapted to be joined to a pipe, a control unit programmed to control generation of successive cycles, each comprising:

a step of a first ultrasound transducer from among said at least two ultrasound transducers transmitting an ultrasound wave;

a step of a second transducer from among said at least two ultrasound transducers receiving the transmitted ultrasound wave; and a step of measuring a time for said ultrasound wave to be propagated from the first ultrasound transducer to the second ultrasound transducer, the first ultrasound transducer for a given cycle corresponding to the second ultrasound transducer for a cycle directly succeeding said given cycle and the second ultrasound transducer for a given cycle corresponding to the first ultrasound transducer for the cycle directly succeeding said given cycle, wherein a given cycle is separated from a cycle directly preceding said given cycle by a duration, referred to as the intercycle duration, which is greater than or equal to 15 ms, and in that the control unit is programmed to carry out at least one fluid flow rate computation step in which a flow rate of a fluid flowing at the time of a given cycle in the pipe is computed on the basis of a difference between the propagation time measured for said given cycle and an average between the propagation time measured for the preceding cycle and the propagation time measured for the cycle directly succeeding said given cycle.

10. The flowmeter as claimed in claim 9, wherein the flowmeter comprises said pipe on which the two ultrasound transducers are mounted, this pipe having two longitudinal ends comprising a connecting member.

\* \* \* \* \*